US010712905B2

(12) United States Patent
Taki

(10) Patent No.: US 10,712,905 B2
(45) Date of Patent: Jul. 14, 2020

(54) DISPLAY INPUT DEVICE

(71) Applicant: KYOCERA Document Solutions Inc., Osaka (JP)

(72) Inventor: Kosuke Taki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/696,294

(22) Filed: Nov. 26, 2019

(65) Prior Publication Data

US 2020/0192552 A1     Jun. 18, 2020

(30) Foreign Application Priority Data

Dec. 14, 2018   (JP) ................ 2018-234611

(51) Int. Cl.
| | |
|---|---|
| *G06F 3/0483* | (2013.01) |
| *G06F 3/0481* | (2013.01) |
| *G06F 3/041* | (2006.01) |
| *G06F 3/0488* | (2013.01) |
| *G06F 3/0484* | (2013.01) |
| *G06F 3/0482* | (2013.01) |

(52) U.S. Cl.
CPC .......... *G06F 3/04817* (2013.01); *G06F 3/041* (2013.01); *G06F 3/0482* (2013.01); *G06F 3/0483* (2013.01); *G06F 3/04845* (2013.01); *G06F 3/04886* (2013.01); *G06F 2203/04114* (2019.05)

(58) Field of Classification Search
CPC .. G06F 3/0483; G06F 3/04817; G06F 3/0482; G06F 3/04845

USPC .......................................................... 715/769
See application file for complete search history.

(56) References Cited

U.S. PATENT DOCUMENTS

| | | | | |
|---|---|---|---|---|
| 2011/0271182 | A1* | 11/2011 | Tsai ...................... | G06F 3/0486 715/702 |
| 2011/0291985 | A1* | 12/2011 | Wakako .............. | G06F 3/04817 345/174 |
| 2012/0166987 | A1 | 6/2012 | Kang et al. .................. | 715/765 |
| 2013/0080951 | A1* | 3/2013 | Chuang ................ | G06F 3/0486 715/765 |

(Continued)

FOREIGN PATENT DOCUMENTS

| | | |
|---|---|---|
| EP | 2 988 197 A1 | 6/2014 |
| JP | 2016-115337 A | 6/2016 |

OTHER PUBLICATIONS

Extended European Search Report dated May 12, 2020, issued by the European Patent Office in corresponding application EP 19211187.0.

*Primary Examiner* — Daniel Rodriguez
(74) *Attorney, Agent, or Firm* — Stein IP, LLC

(57) ABSTRACT

A control portion, when a page transition condition is met while a contact position on a touch screen by a contact body operating an icon is in a target area, makes the touch screen perform processing for displaying another page and moving the icon being operated to the other page. The control portion classifies any of the icons which is not in the target area into a first group and any of the icons of which at least a part is in the target area into a second group, and changes the page transition condition depending on whether an icon in the first group is being operated or an icon C in the second group is being operated.

4 Claims, 7 Drawing Sheets

(56) References Cited

U.S. PATENT DOCUMENTS

| | | | |
|---|---|---|---|
| 2014/0006990 A1* | 1/2014 | Harada | G06F 1/1616 715/769 |
| 2014/0013254 A1* | 1/2014 | Hosein | G06F 3/0486 715/765 |
| 2014/0068477 A1* | 3/2014 | Roh | G06F 3/04886 715/765 |
| 2014/0165006 A1* | 6/2014 | Chaudhri | G06F 3/04817 715/835 |
| 2014/0289669 A1* | 9/2014 | Wang | G06F 3/0483 715/781 |
| 2015/0121271 A1* | 4/2015 | Huang | G06F 3/04842 715/769 |
| 2016/0034130 A1* | 2/2016 | Li | G06F 3/0486 715/769 |
| 2016/0071241 A1* | 3/2016 | Karunamuni | G06F 3/04886 345/156 |
| 2016/0162157 A1* | 6/2016 | Liang | G06F 8/65 715/765 |
| 2016/0165128 A1* | 6/2016 | Krug | H04L 51/043 348/207.1 |
| 2016/0170600 A1 | 6/2016 | Horike | |
| 2016/0253063 A1* | 9/2016 | Critchlow | G06F 3/0486 715/769 |
| 2016/0320937 A1* | 11/2016 | Zhou | G06F 3/0482 |
| 2018/0032243 A1* | 2/2018 | Lu | G06F 3/0486 |
| 2018/0329598 A1* | 11/2018 | Park | G06F 3/04817 |
| 2019/0346985 A1* | 11/2019 | Roard | G06F 3/04842 |

* cited by examiner

DISPLAY INPUT DEVICE

INCORPORATION BY REFERENCE

This application is based on and claims the benefit of Japanese Patent Application No. 2018-234611 filed on Dec. 14, 2018, the contents of which are hereby incorporated by reference.

BACKGROUND

The present disclosure relates to a display input device provided with a touch screen.

Conventionally, there are known display input devices which include a touch screen.

A conventionally common display input device displays a page with icons arranged on it on a touch screen. When tap operation is performed on an icon, the display input device performs processing associated with the operated icon.

While a page with icons arranged on it is being displayed, performing prescribed touch operation on the touch screen allows the icon arranged in the page being displayed to move to another page (it is possible to arrange the icon in another page), Specifically, performing drag operation on an icon and moving the icon being operated to an end part of the page cause anther page to be displayed on the touch screen (a page transition is made). After another page is displayed, ceasing drag operation on an icon allows the icon being operated to be arranged in another page.

SUMMARY

According to one aspect of what is disclosed herein, a display input device according to the present disclosure is provided with a touch screen and a control portion. The touch screen displays a page on which a plurality of icons are arranged and accepts operation of touching a display area of any of the icons with a contact body. The control portion controls the touch screen. The control portion sets an area with a predetermined width from any of sides of the page as a target area, and when a prescribed page transition condition is met while a contact position on the touch screen by a contact body operating the icon is in the target area or while at least a part of the icon being operated by the contact body is in the target area, the control portion makes the touch screen perform processing for displaying another page and moving the icon to the other page. The control portion classifies, of a plurality of icons, any which is not in the target area into a first group and any of which at least a part is in the target area into a second group, and changes the page transition condition depending on whether an icon in the first group is being operated or an icon C in the second group is being operated.

DETAILED DESCRIPTION

A display input device according to one embodiment of the present disclosure will be described below. For example, the present disclosure is applied to mobile terminals such as smartphones and tablet computers. The present disclosure may be applied also to operation panels in image forming apparatuses.

Structure of Display Input Device

Figure 1:
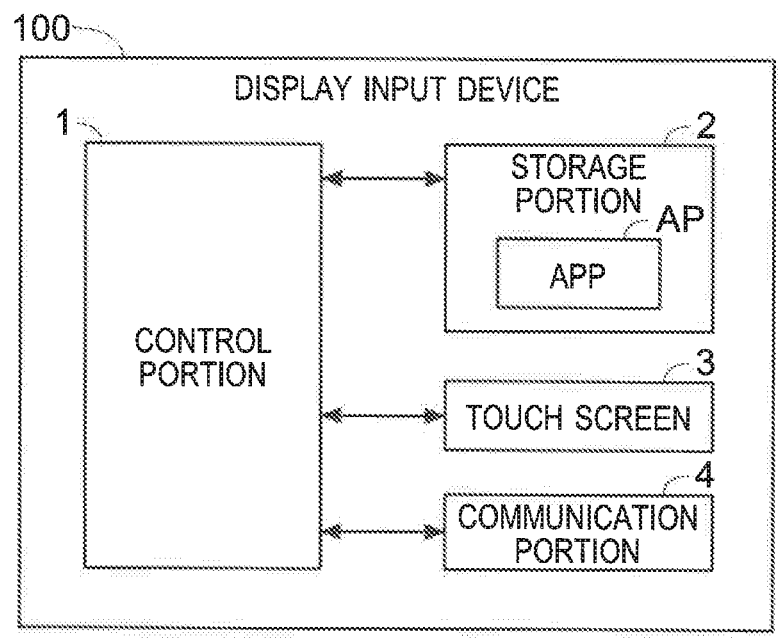
FIG. 1 is a diagram showing a structure of a display input device according to one embodiment of the present disclosure.

As shown in FIG. 1, a display input device 100 according to this embodiment is provided with a control portion 1, The control portion 1 includes a processing circuit such as a CPU. The control portion 1 controls different parts of the display input device 100 based on a control program and control data.

The display input device 100 is provided with a storage portion 2. The storage portion 2 includes a non-volatile memory (ROM) and a volatile memory (RAM). The storage portion 2 is connected to the control portion 1. The control program and control data are stored in the storage portion 2.

On the display input device 100, an application AP (hereinafter, referred to as app AP) is installed. The app AP installed on the display input device 100 is stored in the storage portion 2.

The display input device 100 is provided with a touch screen 3. The touch screen 3 includes a liquid crystal display panel and a touch panel. The touch screen 3 displays a screen and accepts operation on the display screen from a user. Touch operation in which a contact body such as a user's finger or a touch pen touches the touch screen 3 is accepted as operation on the display screen. Touch operation includes tap operation (operation like tapping the touch screen 3 with the contact body) and flick operation (operation like flicking across the touch screen 3 with the contact body).

The touch screen 3 is connected to the control portion 1. The control portion 1 controls display operation on the touch screen 3. The control portion 1 senses touch operation on the display screen of the touch screen 3.

Here, the control portion 1 operates such that icons C (see FIG. 2) for starting apps AP are displayed on the touch screen 3. The control portion 1, for example, when sensing tap operation on a display area of an icon C, judges that start-up operation for starting up an app AP has been accepted, and starts up the app AP corresponding to the icon C which has accepted tap operation.

The display input device 100 is provided with a communication portion 4. The communication portion 4 is a communication interface for connecting the display input device 100 to a network such as the Internet and includes a communication circuit, a communication memory, and so on. The communication portion 4 is connected to the control portion 1. The control portion 1 communicates with external devices connected to the network using the communication portion 4.

Page on which Icons are Arranged

Figure 2:
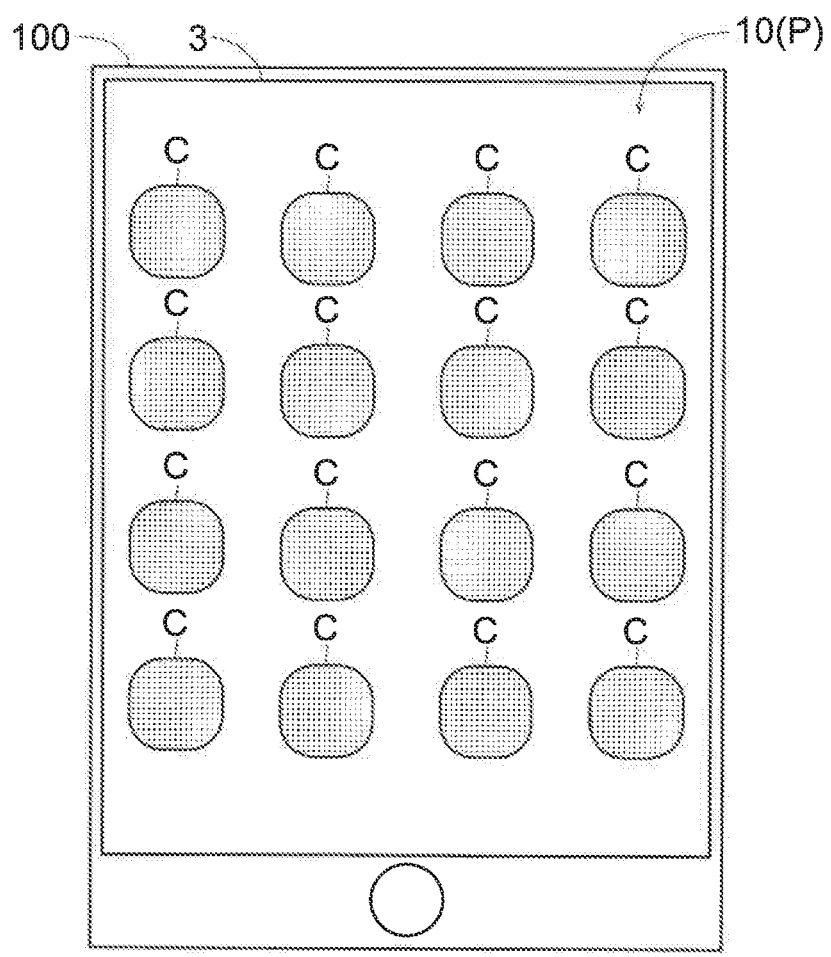
FIG. 2 is a diagram showing a home screen displayed on the display input device according to the one embodiment of the present disclosure.

The control portion 1, when the display input device 100 starts up, operates such that a home screen 10 as shown in FIG. 2 is displayed on the touch screen 3. The home screen 10 is a screen of a page P on which icons C corresponding to apps AP are arranged. That is, the home screen 10 is a screen for accepting start-up operation of an app AP from a user.

When a plurality of apps AP are installed, a plurality of icons C corresponding to a plurality of apps AP are displayed. The upper limit of the number of icons C is prescribed, and icons C over the upper limit cannot be arranged on a single page P. The following description supposes that the upper limit number is 16 (the upper limit numbers along the up-down and left-right directions being 4 respectively). FIG. 2 shows a page P on which 16 icons C are arranged.

Here, pages P can be added to the home screen 10, That is, the home screen 10 can have a plurality of pages P. A user can freely add pages P to the home screen 10.

The control portion 1, on accepting start-up operation for an app AP, even when the home screen 10 has a plurality of pages P, operates such that only a given page P is displayed on the touch screen 3 without the other pages P displayed on the touch screen 3. The control portion 1, on judging that it has accepted page switching operation while the home screen 10 is displayed, makes the touch screen 3 switch pages P on the home screen 10. For example, upon sensing flicking operation on the home screen 10, the control portion 1 judges that it has accepted page switching operation.

Moving an Icon to a Different Page

The control portion 1, while the home screen 10 is displayed, performs condition judging processing in which it checks whether a prescribed page transition condition is met or not (whether operation meeting the page transition condition is being performed or not on any of the icons C being displayed). In other words, when any of the icons C being displayed is being operated, the control portion 1 performs condition judging processing. On judging that the page transition condition is met, the control portion 1 makes the touch screen 3 perform icon moving processing. The touch screen 3 performs, as icon moving processing, processing in which it displays another page P instead of the page P being displayed and then moves (arranges) the icon C being operated to (on) the other page P.

Here, the control portion 1, prior to condition judging processing, performs classification processing in which it classifies a plurality of icons C into first and second groups based on their arranged positions on the page P being displayed. Then, the control portion 1 changes the page transition condition depending on whether an icon C in the first group is being operated or an icon C in the second group is being operated. This will now be described specifically.

Figure 3:
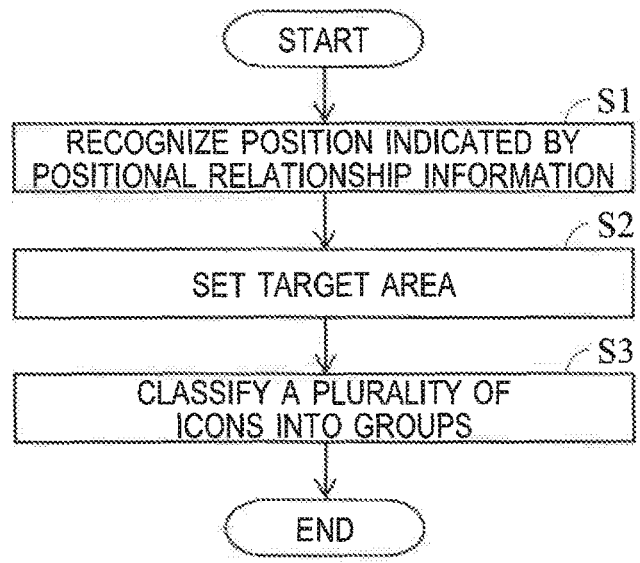
FIG. 3 is a flow chart showing a flow of classification processing performed by the display input device according to the one embodiment of the present disclosure.

First, with reference to the flow chart shown in FIG. 3, the flow of classification processing performed by the control portion 1 will be described. The flow chart shown in FIG. 3 starts when any of the plurality of pages P of the home screen 10 is displayed on the touch screen 3.

In step S1, the control portion 1 extracts positional relationship information that indicates the position, relative to the page P being displayed (hereinafter, identified by P1), of another page P (hereinafter, identified by P2) to which a transition is possible from the page P1, and recognizes the position indicated by the extracted positional relationship information. Positional relationship information is stored in the storage portion 2.

For example, when another page P2 is added before the page P1 being displayed, positional relationship information corresponding to the page P1 includes information that the position of the other page P2 is to the left. When another page P2 is added after the page P1 being displayed, positional relationship information corresponding to the page P1 includes information that the position of the other page P2 is to the right.

When other pages P2 are added before and after the page P1 being displayed, positional relationship information corresponding to the page P1 includes information that the position of the other page P2 is to the left and information that the position of the other page P2 is to the right. It should be noted that another page P2 can be added above the page P1 being displayed and another page P2 can be added under the page P1 being displayed.

In step S2, the control portion 1 recognizes, as a target side, that one of the four sides (top, bottom, left, and right sides) of the page P1 being displayed which corresponds to the position indicated by positional relationship information. Then, the control portion 1 sets, as a target area TA (see FIG. 4), an area with a predetermined width W from the target side. The predetermined width W is prescribed. Information indicating the predetermined width W is stored in the storage portion 2. For example, the predetermined width W is set between several millimeters and ten and several millimeters. A user can freely change the predetermined width W.

Figure 4:
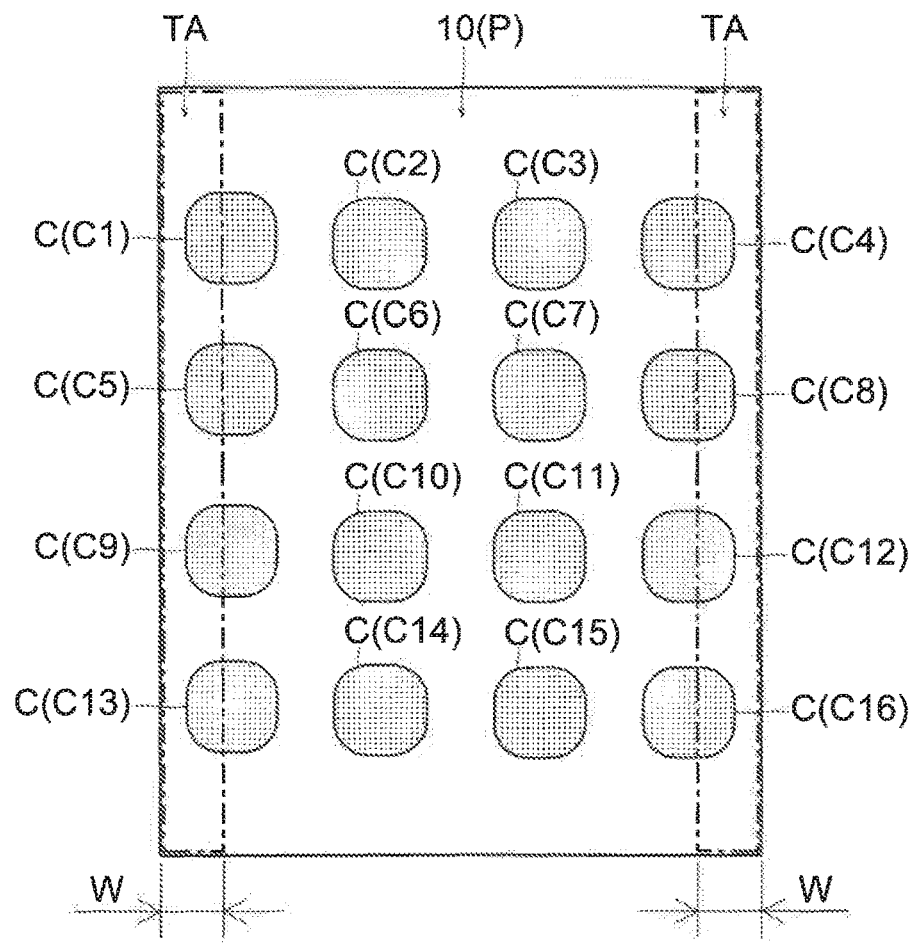
FIG. 4 is a diagram illustrating classification processing performed by the display input device according to the one embodiment of the present disclosure.

For example, suppose that other pages P2 are added before and after the page P1 being displayed. In this case, as shown in FIG. 4, an area with the predetermined width W from the left side of the page P1 (the area surrounded by a dash-dot line) and an area with the predetermined width W from the right side of the page P1 (the area surrounded by a dash-dot line) are set as target areas TA respectively. In FIG. 4, for convenience, 16 icons C are identified by the reference signs C1 to C16 respectively (the same applies also to the diagrams referred to in the following description).

With reference back to FIG. 3, in step S3, the control portion 1 classifies the plurality of icons C arranged on the page P1 being displayed into groups. The control portion 1 classifies, of the plurality of icons C, any which is not in the target area TA into the first group. The control portion 1 classifies, of the plurality of icons C, any of which at least a part is in the target area TA into the second group.

In the example shown in FIG. 4, icons C2, C3, C6, C7, C10, C11, C14, and C15 are classified into the first group. The icons C1, C4, C5, C8, C9, C12, C13, and C16 are classified into the second group.

Next, condition judging processing performed by the control portion 1 will be described.

The control portion 1 performs condition judging processing when any of the icons C being displayed is operated. When operation for the icon C being displayed is tap or flick operation, the control portion 1 does not perform condition judging processing. In other words, when operation for the icon C being displayed is drag or long-press operation, the control portion 1 performs condition judging processing.

Drag operation is operation in which the display area of an icon C is touched with the contact body and then the contact body is moved without being released from the touch screen 3. Long-press operation is operation in which, after the display area of the icon C is touched by the contact body, the touch screen 3 is kept touched until a predetermined time passes.

Here, condition judging processing includes first processing and second processing. The control portion 1 performs first processing when the icon C being operated is in the first group. On the other hand, the control portion 1 performs second processing when the icon C being operated is in the second group.

When first processing is performed, the control portion 1, based on the contact position on the touch screen 3 by the contact body operating an icon C in the first group, judges whether the page transition condition is met or not. The control portion 1 may judge whether the page transition condition is met or not based on the position (position after movement by drag operation) of the icon C in the first group being operated by the contact body.

Figure 5:
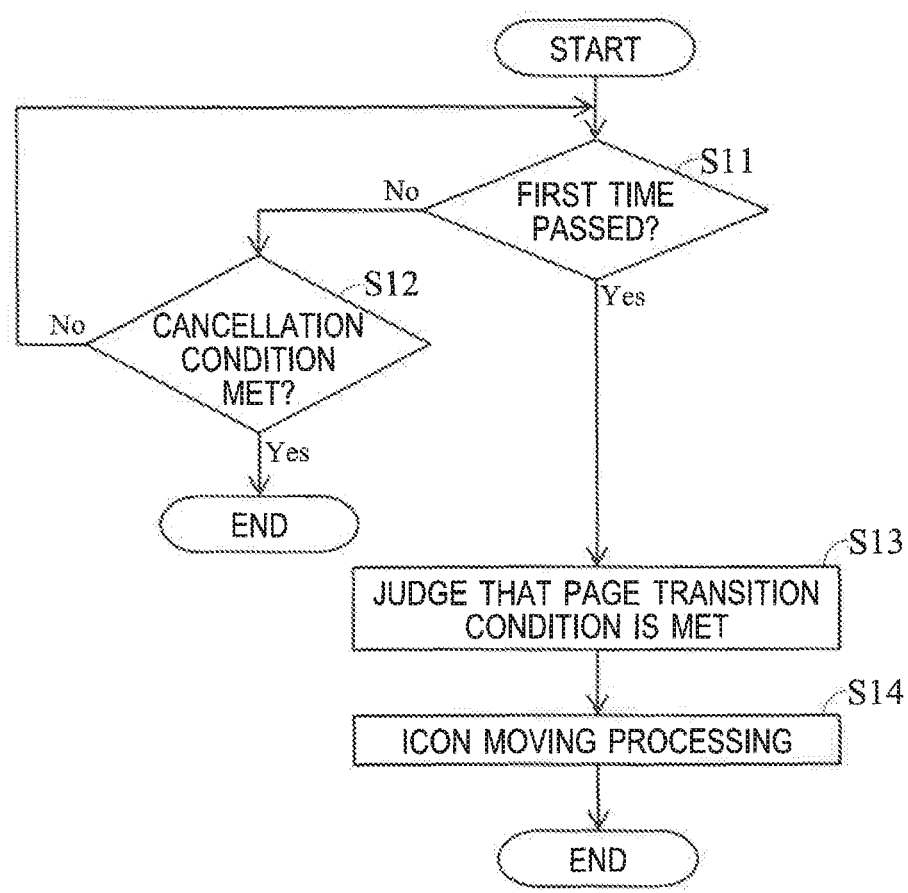
FIG. 5 is a flow chart showing a flow of condition judging processing (first processing) performed by the display input device according to the one embodiment of the present disclosure.

A more specific description of first processing will be given below with reference to the flow chart shown in FIG. 5. The flow chart shown in FIG. 5 starts when the control portion 1 judges that the starting condition for condition judging processing is met. The control portion 1, when the contact position on the touch screen 3 by the contact body operating an icon C in the first group enters the target area TA, judges that the starting condition for condition judging processing is met.

Figure 6:
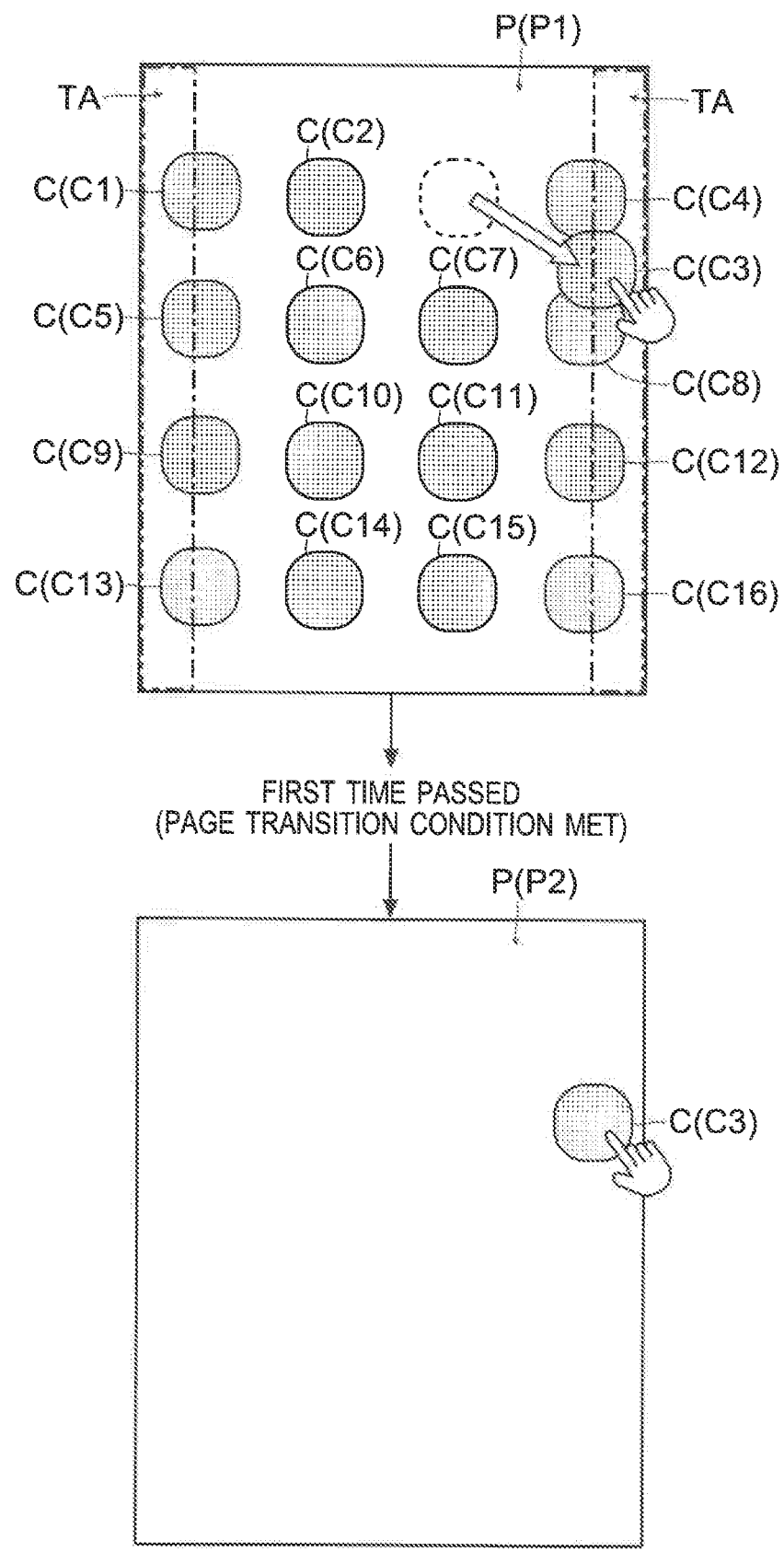
FIG. 6 is a diagram illustrating condition judging processing (first processing) performed by the display input device according to the one embodiment of the present disclosure.

Here, as shown in the upper diagram of FIG. 6, the icons C in the first group (the icons C2, C3, C6, C7, C10, C11, C14, and C15) are not in the target area TA. Thus, when drag operation for an icon C in the first group is performed and the contact position on the touch screen 3 by the contact body operating the icon C in the first group enters the target area TA, the control portion 1 judges that the starting condition for condition judging processing is met. FIG. 6 shows a state where drag operation for the icon C3 is being performed. In FIG. 6, the contact body is indicated by a finger mark and the movement locus of the icon C3 is indicated by a hollow arrow.

In step S11, the control portion 1 judges whether a prescribed first time has passed or not while the contact position on the touch screen 3 by the contact body operating the icon C in the first group is in the target area TA. In a configuration in which the control portion 1 judges whether the page transition condition is met or not based on the position of the icon C in the first group being operated by the contact body, the control portion 1 judges whether the first time has passed while at least a part of the icon C in the first group being operated is in the target area TA.

In step S11, when the control portion 1 judges that the first time has not passed, the procedure proceeds to step S12. In step S12, the control portion 1 judges whether the cancellation condition is met or not. As a result, when the control portion 1 judges that the cancellation condition is met, the procedure ends. On the other hand, when the control portion 1 judges that the cancellation condition is not met, the procedure proceeds to step S11.

The control portion 1, when the contact body is released from the touch screen 3 before the first time passes, judges that the cancellation condition is met.

The control portion 1, when the contact position of the contact body on the touch screen 3 deviates from the target area TA before the first time passes, judges that the cancellation condition is met. In a configuration in which the control portion 1 judges whether the page transition condition is met or not based on the position of the icon C in the first group being operated by the contact body, the control portion 1 judges that the cancellation condition is met when the icon C in the first group being operated deviates from the target area TA before the first time passes.

In step S11, when the control portion 1 judges that the first time has passed, the procedure proceeds to step S13. In step S13, the control portion 1 judges that the page transition condition is met. Then, in step S14, the control portion 1 makes the touch screen 3 perform icon moving processing.

For example, suppose that the page transition condition is met in a state shown in the upper diagram of FIG. 6 (the state in which the page P1 is displayed). In this case, a display transition from the page P1 to another page P2 is performed. Then, as shown in the lower diagram of FIG. 6, the icon C3 moves to the other page P2. After the transition from the page P1 to the other page P2, releasing the contact body from the touch screen 3 allows the icon C3 to be arranged in the other page P2.

When second processing is performed, the control portion 1, based on the contact position on the touch screen 3 by the contact body operating an icon C in the second group, judges whether the page transition condition is met or not. The judgement by the control portion 1 of whether the page transition condition is met or not may be based on the position of the icon C in the second group being operated by the contact body.

Figure 7:
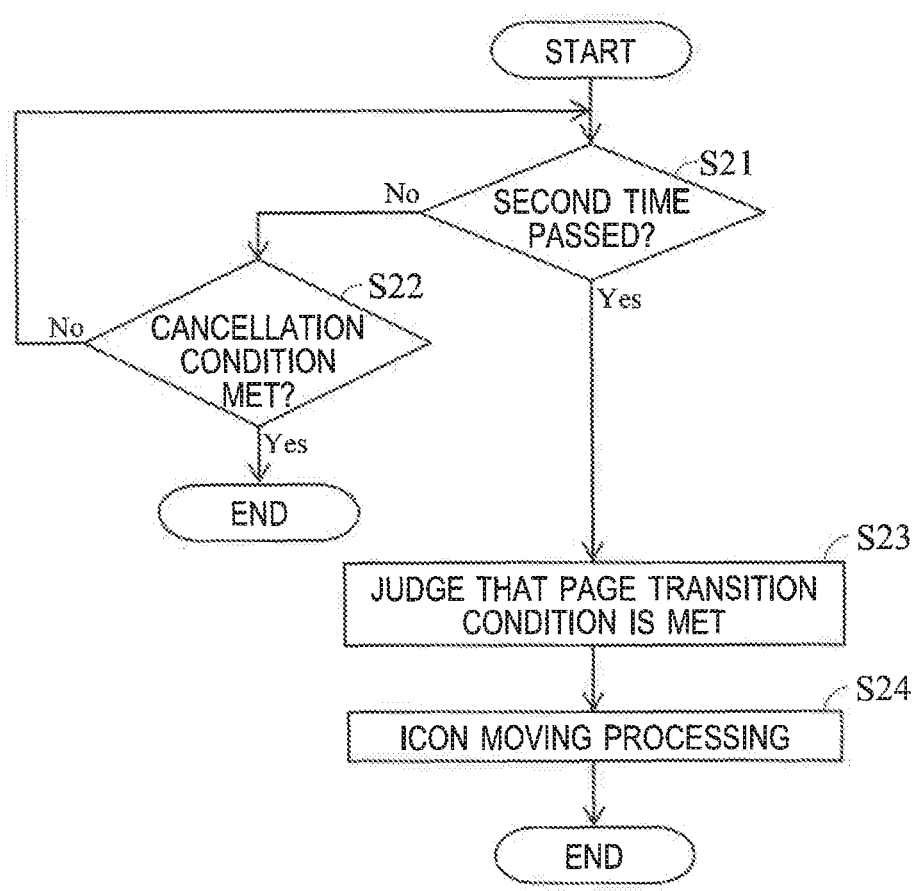
FIG. 7 is a flow chart showing a flow of condition judging processing (second processing) performed by the display input device according to the one embodiment of the present disclosure.

A more specific description of second processing will be given below with reference to the flow charts shown in FIG. 7. The flow chart shown in FIG. 7 starts when the control portion 1 judges that the starting condition for condition judging processing is met. The control portion 1, when the contact position on the touch screen 3 by the contact body operating an icon C in the second group enters the target area TA, judges that the starting condition for condition judging processing is met.

Figure 8:
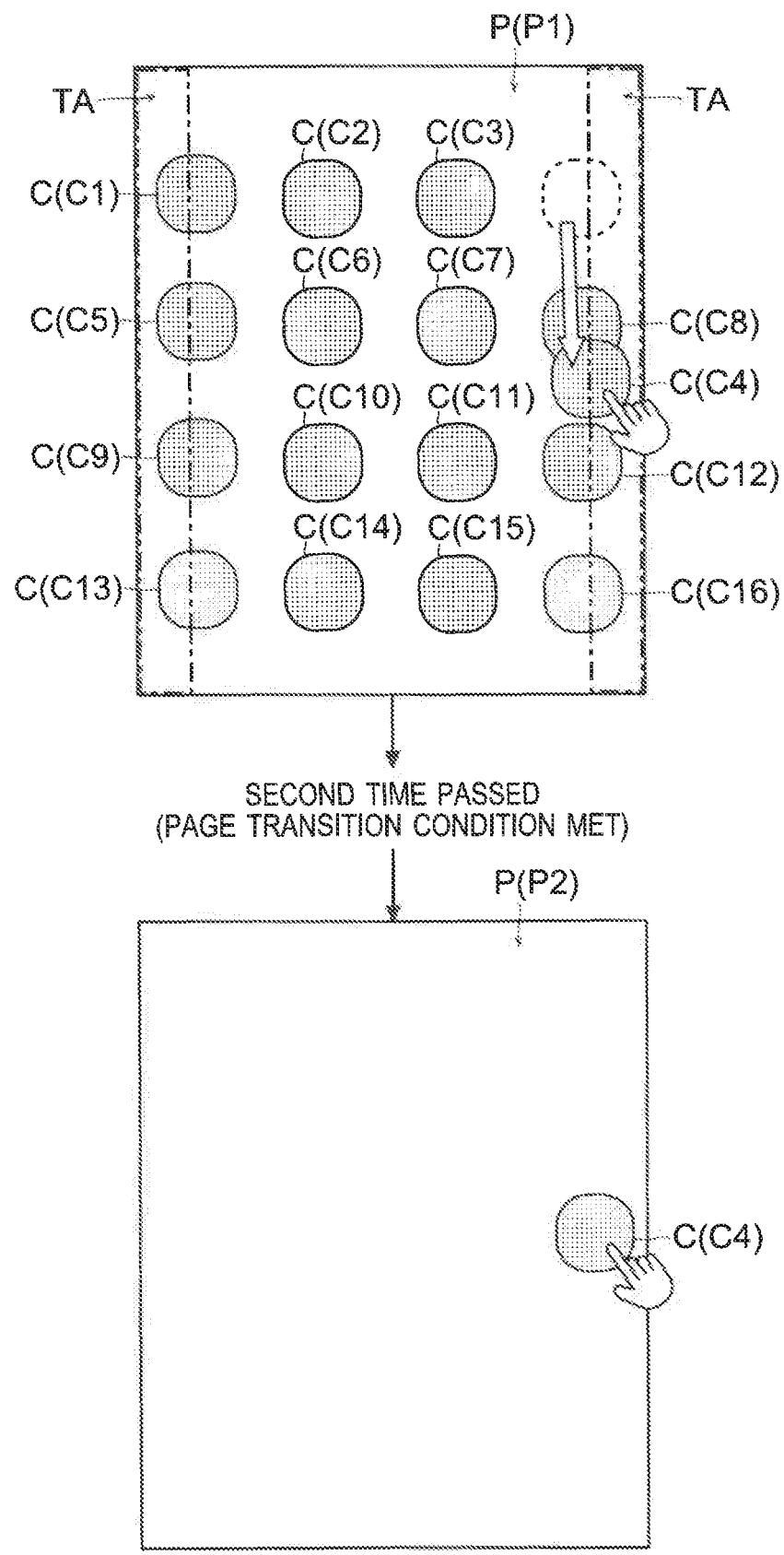
FIG. 8 is a flow chart illustrating condition judging processing (second processing) performed by the display input device according to the one embodiment of the present disclosure.

Here, as shown in the upper diagram of FIG. 8, each of the icons C in the second group (the icons C1, C4, C5, C8, C9, C12, C13, and C16) has a first part which is in the target area TA and a second part which is not in the target area TA. Thus, when long-press operation for the first part of an icon C in the second group is performed, the control portion 1 judges that the starting condition for condition judging processing is met. When the contact body touches the second part of an icon C in the second group and drag operation is performed such that the contact position on the touch screen 3 by the contact body enters the target area TA, the control portion 1 judges that the starting condition for condition judging processing is met, FIG. 8 shows a state where drag operation on the icon C4 is being performed. In FIG. 8, the contact body is indicated by a finger mark and the movement locus of the icon C4 is indicated by a hollow arrow.

In step S21, the control portion 1 judges whether a prescribed second time, which is longer than the first time, has passed or not while the contact position on the touch screen 3 by the contact body operating an icon C in the second group is in the target area TA. In a configuration in which the control portion 1 judges whether the page transition condition is met or not based on the position of the icon C in the second group being operated by the contact body, the control portion 1 judges whether the second time has passed while at least a part of the icon C in the second group being operated is in the target area TA.

In step S21, when the control portion 1 judges that the second time has not passed, the procedure proceeds to step S22. In step S22, the control portion 1 judges whether the cancellation condition is met or not. As a result, when the control portion 1 judges that the cancellation condition is met, the procedure ends. On the other hand, when the control portion 1 judges that the cancellation condition is not met, the procedure proceeds to step S21.

The control portion 1, when the contact body is released from the touch screen 3 before the second time passes, judges that the cancellation condition is met.

The control portion 1, when the contact position of the contact body on the touch screen 3 deviates from the target area TA before the second time passes, judges that the cancellation condition is met. In a configuration in which the control portion 1 judges whether the page transition condition is met or not based on the position of the icon C in the second group being operated by the contact body, the control portion 1 judges that the cancellation condition is met when the icon C in the second group being operated deviates from the target area TA before the second time passes.

In step S21, when the control portion 1 judges that the second time has passed, the procedure proceeds to step S23. In step S23, the control portion 1 judges that the page transition condition is met. Then, in step S24, the control portion 1 makes the touch screen 3 perform icon moving processing.

For example, suppose that the page transition condition is met in a state shown in the upper diagram of FIG. 8 (the state in which the page P1 is displayed), in this case, a display transition from the page P1 to another page P2 is performed. Then, as shown in the lower diagram of FIG. 8, the icon C4 moves to the other page P2. After transition from the page P1 to the other page P2, releasing the contact body from the touch screen 3 allows the icon C4 to be arranged in the other page P2.

Figure 9:
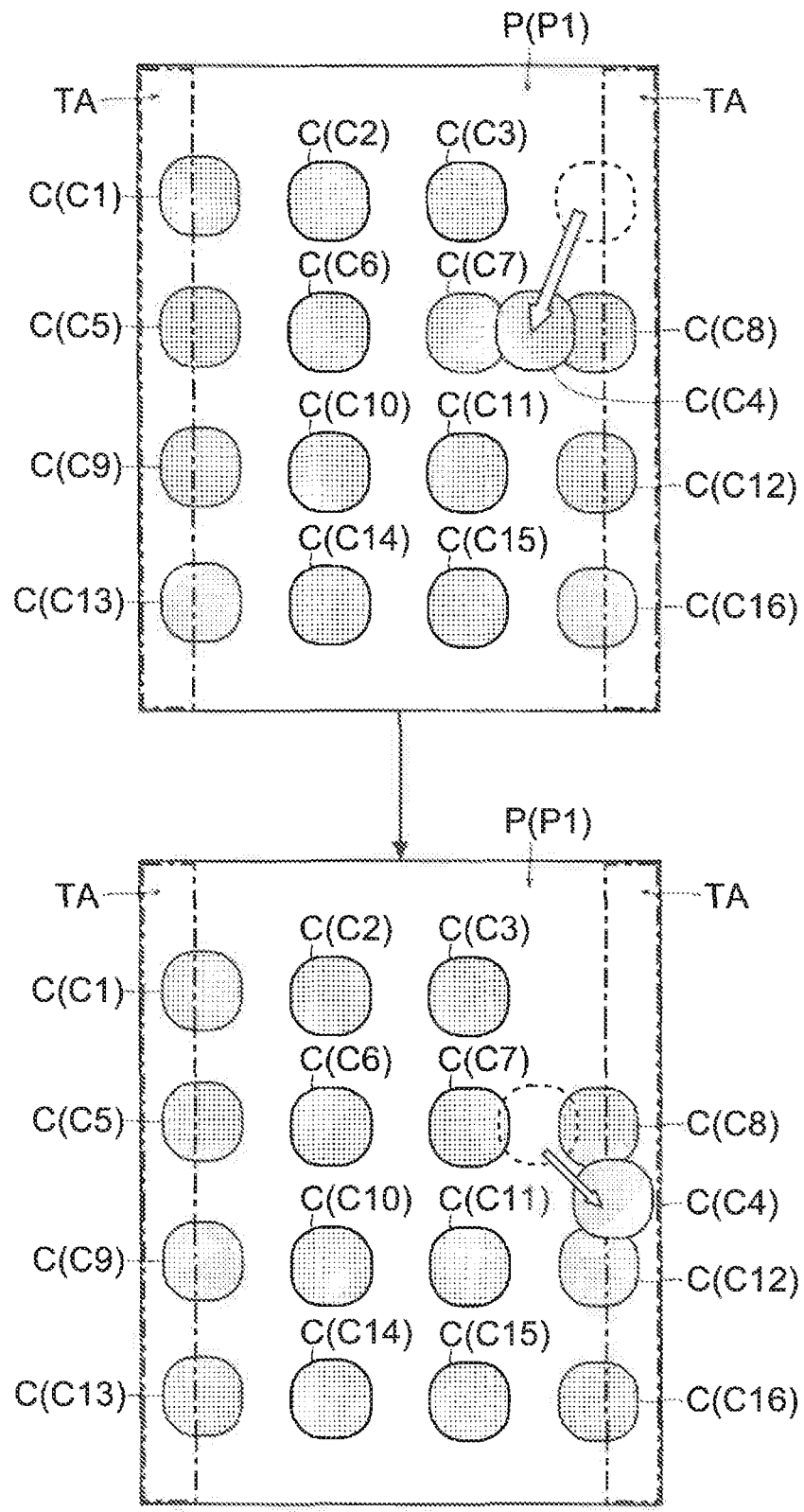
FIG. 9 is a diagram showing a movement locus of an icon displayed on the display input device according to the one embodiment of the present disclosure.

Here, as shown in FIG. 9, operation may be performed in which the icon C in the second group is moved outside the target area TA (see the upper diagram) and is then moved back into the target area TA (see the lower diagram). Also in this case, the control portion 1 judges that the starting condition for condition judging processing is met. In this case, the control portion 1 performs, as condition judging processing, first processing instead of second processing.

That is, in a case where operation shown in FIG. 9 is performed on an icon C in the second group, the control portion 1 judges that the page transition condition is met when the first time has passed while the contact position on the touch screen 3 by the contact body operating the icon C in the second group is in the target area TA. In a configuration in which the control portion 1 judges whether the page transition condition is met or not based on the position of the icon C in the second group being operated by the contact body, the control portion 1 judges that the page transition condition is met when the first time has passed while at least a part of the icon C in the second group being operated is in the target area TA.

The display input device 100 of this embodiment, as described above, includes a touch screen 3 which displays a page P (P1) with a plurality of icons C arranged on it and which accepts operation of touching the display area of any of the icons C being displayed with a contact body and a control portion 1 which controls the touch screen 3. The control portion 1 sets the area with a predetermined width W from a side of the page P being displayed as a target area TA, and when a prescribed page transition condition is met while a contact position on the touch screen 3 by the contact body operating the icon C is in the target area TA or while at least a part of the icon C being operated by the contact body is in the target area TA, the control portion 1 makes the touch screen 3 perform icon moving processing. The touch screen 3 performs, as icon moving processing, processing in which another page P (P2) is displayed instead of the page P being displayed and then moves the icon C being operated to the other page P.

The control portion 1 classifies, of the plurality of icons C being displayed, any which is not in the target area TA into a first group and any of which at least a part is in the target area TA into a second group. Then, the control portion 1 changes the page transition condition depending on whether an icon C in the first group is operated or an icon C in the second group is operated.

With the configuration of this embodiment, of the plurality of icons C arranged on the page P being displayed, any which is arranged in a central part of the page P is classified into the first group and any which is arranged in an end part of the page P is classified into the second group. This makes it possible to change the page transition condition depending on whether an icon C arranged in the central part of the page P is being operated or an icon C arranged at the end part in the page P is being operated. That is, it is possible to make a transition of the page P less easy when an icon C arranged in the end part of the page P is operated. This makes it possible to improve operability of icons C arranged in the end part of the page P. For example, it is possible to prevent occurrence of such an inconvenience in which, even though starting up of an app AP corresponding to an icon C arranged in the end part of the page P is intended, a transition of the page P is made.

In this embodiment, as described above, in a case where an icon C in the first group is being operated, the control portion 1 judges that the page transition condition is met when a prescribed first time (shorter than a second time) has passed while the contact position on the touch screen 3 by the contact body operating the icon C in the first group is in the target area TA or while at least a part of the icon C in the first group being operated by the contact body is in the target area TA. With this configuration, it is possible to prevent occurrence of such an inconvenience in which a transition of the page P takes time (a user has to wait longer) when operation for moving the icon C arranged in the central part of the page P to the end part of the page P is performed with an intention to move it to another page (transition of the page P).

In this embodiment, as described above, in a case where an icon C in the second group is being operated, the control portion 1 judges that the page transition condition is met when the prescribed second time longer than the first time has passed while the contact position on the touch screen 3 by the contact body operating the icon C in the second group is in the target area TA or while at least a part of the icon C in the second group being operated by the contact body is in the target area TA. With this configuration, the page P does not make a transition unless the contact body is kept in contact with the touch screen 3 until the second time passes. This makes it possible to reliably prevent occurrence of such an inconvenience in which the page P makes an unintended transition.

In this embodiment, as described above, in a case where an icon C in the second group is moved outside the target area TA and then is moved back into the target area TA, the control portion 1 judges that the page transition condition is met when the first time has passed while the contact position on the touch screen 3 by the contact body operating the icon C in the second group is in the target area TA or while at least a part of the icon C in the second group being operated by the contact body is in the target area TA. With this configuration, when the icon C arranged in the end part of the page P needs to be moved to another page P (when a transition of the page P is desired), moving the icon C outside the target area TA and then back into the target area TA allows a quick transition of the page P.

Here, in the example shown in FIG. 6, suppose that another page P2 is added only after a page P1, In this case, although operating the icon C at a right end part of the page P1 causes a transition to another page P2, operating the icon C at a left end part does not cause a transition to another page P2. Thus, it is not necessary to classify the icons C (icons C1, C5, C9, and C13) at the left end part of the page P1 into the second group.

Thus, the control portion 1 sets the area with the predetermined width W from, of the four sides of the page P being displayed, the side (target side) corresponding to the position indicated by positional relationship information as the target area TA. Thus, in the above example, the target area TA is set only at the right end part of the page P1. As a result, the icons C (icons C1, C5, C9, and C13) at the left end part of the page P1 is classified into the second group.

The embodiments disclosed above should be understood to be in every aspect illustrative and not restrictive. The scope of the present disclosure is not limited by the description of the embodiments given above but by the appended claims, and encompasses any modifications made within a sense and scope equivalent to those of the claims.

What is claimed is:

1. A display input device comprising:
   a touch screen which displays a page with a plurality of icons arranged thereon and which accepts operation of touching a display area of any of the icons with a contact body; and
   a control portion which controls the touch screen, wherein
   the control portion sets an area with a predetermined width from any side of the page as a target area, and when a prescribed page transition condition is met while a contact position on the touch screen by the contact body operating the icon is in the target area or while at least a part of the icon being operated by the contact body operating the icon is in the target area, the control portion makes the touch screen perform processing for displaying another page and moving the icon being operated to the other page, and
   the control portion classifies, of the plurality of icons being displayed, any of the icons which is not in the target area into a first group and any of the icons of which at least a part is in the target area into a second group, and
   changes the page transition condition depending on whether an icon in the first group is being operated or an icon in the second group is being operated.

2. The display input device according to claim 1, wherein
   in a case where the icon in the first group is being operated, the control portion judges that the page transition condition is met when a prescribed first time has passed while the contact position on the touch screen by the contact body operating the icon in the first group is in the target area or while at least a part of the icon in the first group being operated by the contact body is in the target area, and
   in a case where the icon in the second group is being operated, the control portion judges that the page transition condition is met when a prescribed second time longer than the first time has passed while the contact position on the touch screen by the contact body operating the icon in the second group is in the target area or while at least a part of the icon in the second group being operated by the contact body is in the target area.

3. The display input device according to claim 2, wherein
   in a case where operation is performed in which the icon in the second group is moved outside the target area and then is moved back into the target area, the control portion judges that the page transition condition is met when the first time has passed while the contact position on the touch screen by the contact body operating the icon in the second group is in the target area or while at least a part of the icon in the second group being operated by the contact body is in the target area.

4. The display input device according to claim 1, further comprising a storage portion which stores positional relationship information showing the position of the other page relative to the page,
   wherein
   the control portion sets the area with the predetermined width from, of the four sides of the page being displayed, the side corresponding to a position indicated by the positional relationship information as the target area.

* * * * *